(12) United States Patent
Johannsen et al.

(10) Patent No.: US 10,676,143 B2
(45) Date of Patent: Jun. 9, 2020

(54) KEYHOLE MASTER TRACK LINK

(71) Applicant: Caterpillar Inc., Peoria, IL (US)

(72) Inventors: Eric James Johannsen, Washington, IL (US); Arthur James Bland, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 208 days.

(21) Appl. No.: 15/718,247

(22) Filed: Sep. 28, 2017

(65) Prior Publication Data

US 2019/0092404 A1 Mar. 28, 2019

(51) Int. Cl.
*B62D 55/21* (2006.01)
*B62D 55/20* (2006.01)

(52) U.S. Cl.
CPC ........... *B62D 55/213* (2013.01); *B62D 55/20* (2013.01)

(58) Field of Classification Search
CPC ...... B62D 55/213; B62D 55/18; B62D 55/20; B62D 55/205; B62D 55/21
See application file for complete search history.

(56) References Cited

U.S. PATENT DOCUMENTS

| | | | |
|---|---|---|---|
| 3,427,079 A | * | 2/1969 | Maytum .............. B62D 55/213 305/186 |
| 3,851,932 A | | 12/1974 | Story et al. |
| 4,105,260 A | | 8/1978 | Blunier et al. |
| 4,262,973 A | | 4/1981 | Grilli et al. |
| 4,351,573 A | | 9/1982 | Bedis et al. |
| 4,361,364 A | * | 11/1982 | Brunn .................. B62D 55/213 305/186 |
| 4,579,394 A | | 4/1986 | Bedis et al. |
| 4,636,014 A | * | 1/1987 | Dennison ............. B62D 55/213 305/186 |
| 6,412,267 B2 | | 7/2002 | Duse |
| 6,412,887 B1 | | 7/2002 | Ketting |
| 8,420,972 B2 | | 4/2013 | Cho |
| 8,671,539 B2 | | 3/2014 | Cho |

FOREIGN PATENT DOCUMENTS

| | | |
|---|---|---|
| JP | S5020329 U | 3/1975 |
| KR | 101526372 B1 | 6/2015 |

* cited by examiner

*Primary Examiner* — Jason R Bellinger
(74) *Attorney, Agent, or Firm* — Law Office of Kurt J. Fugman LLC

(57) ABSTRACT

A pair of master track links has a first master track link including a first body. The first body defines a first bore and includes a first interface region including a plurality of teeth, and at least one tooth of the plurality of teeth includes a free end and a crown defining a crown width proximate the free end of the at least one tooth. The at least one tooth also includes a root disposed opposite the crown defining a root width, and the crown width is greater than the root width.

20 Claims, 5 Drawing Sheets

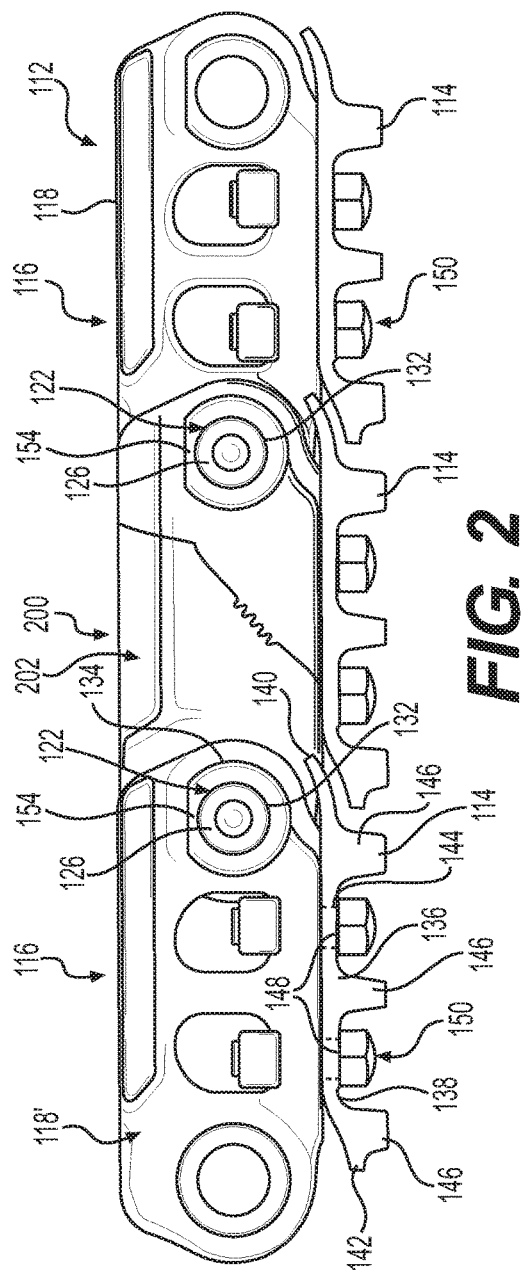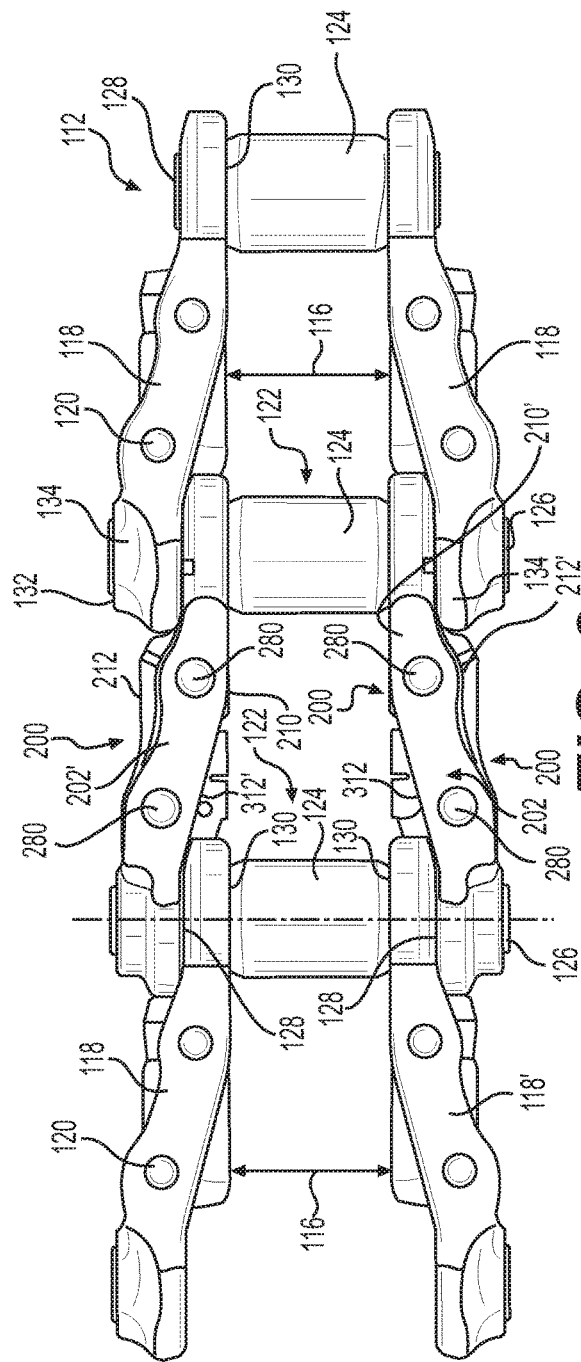

KEYHOLE MASTER TRACK LINK

TECHNICAL FIELD

The present disclosure relates to a method and apparatus for a master track link used for completing a track chain assembly of an endless undercarriage drive employed by earth moving, construction and mining equipment and the like. Specifically, the present disclosure relates to a master track link that has one or more teeth with features that tend to keep the master track link connected to another master track link during assembly before track shoes have been attached to the maters track links.

BACKGROUND

Earth moving, construction and mining equipment and the like are often used in rough, off-road terrain. These machines often employ an endless drive with track shoes that is better able to propel the machines in such environments over obstacles and uneven terrain, etc. The track chains, which include shoes, are held together by a series of interconnected track links, pins and bushings that are supported on the drive sprocket, idler and support rollers of the machine. As can be imagined, a device is typically provided that allows the track chain to be routed about the drive sprocket, idler and support rollers before the free ends of the chain are joined together. This device is called a "master link".

Also, depending on the weight of the machine, the size of the chain, the environment in which the machine operates, and other factors, the chains and/or track shoes may wear or be damaged and may require periodic inspection, servicing, repair, and/or replacement. Hence, a master link may also be provided in the chain to allow disassembly of the chain (i.e., separation of two ends of the chain).

As can be imagined, there can be a great deal of tension on the track chain as the master track links are being mated and assembled to the track chain, or as the master track links are being disassembled or unmated. This may cause the master track links to be separated or forced apart, making the assembly or disassembly process difficult, unwieldly, or cumbersome. More particularly, the assembly process of attaching the master track links to the track chain in many applications is not completed until the track shoes are attached to both master track links. The fasteners that are used to attach the track shoes also hold the master track links together. Until the track shoes are attached to the track chain, the master track links are apt to be pulled away unless some sort of device or fixture is used as an interim measure to keep the master track links engaged until the track shoes have been fastened to the master track links.

One prior master track link that suffers from these deficiencies is disclosed in U.S. Pat. No. 6,412,887 to Ketting et al. FIG. 2 of Ketting et al shows that the five teeth of one master track link mate closely with five teeth of another master track link. More specifically, it discloses that the front and back surfaces of the teeth are parallel to the vertical direction, which is also the direction of assembly or disassembly. Such a master track link, when mated with a similarly configured master track link, will tend to slip away from the master track link until the track shoes are attached. This may result in loss time and profits for an economic endeavor using track type machines employing track chains because a machine using a track drive cannot be utilized until the track chains are assembled.

Accordingly, a master track link that is easier to assemble to another master track link and track chain than has yet been devised is warranted. It may be useful if such a master track link may be used with track chain assemblies already in the field.

SUMMARY

A pair of master track links according to an embodiment of the present disclosure comprises a first master track link including a first body defining a top surface, a bottom surface, a first side surface and a second side surface defining a thickness therebetween, a proximate end and a distal end; wherein the first body defines a first bore adjacent the proximate end; the first body includes a first interface region including a plurality of teeth wherein at least one tooth of the plurality of teeth includes a free end and a crown defining a crown width proximate the free end of the at least one tooth, the at least one tooth also includes a root disposed opposite the crown defining a root width; and the crown width is greater than the root width.

A pair of master track links according to another embodiment of the present disclosure comprises a first master track link including a first body defining a top surface, a bottom surface, a first side surface and a second side surface defining a thickness therebetween, a proximate end and a distal end, a direction of assembly, a direction of disassembly and a direction of tension; wherein the first body defines a first bore adjacent the proximate end; the first body includes a first interface region including a plurality of teeth wherein at least one tooth of the plurality of teeth includes a free end and a crown defining a crown width proximate the free end of the at least one tooth, the at least one tooth also includes a root disposed opposite the crown defining a root width; and the crown width is greater than the root width and the at least one tooth includes an angled front surface connecting the crown to the root, forming an undercut in the direction of disassembly, and a rear surface connecting the crown to the root, not forming an undercut in the direction of disassembly.

A track chain assembly according to an embodiment of the present disclosure comprises a plurality of track pins and track bushings disposed about the track pins; and a plurality of track links that are connected to each other by either a track pin or a track bushing, wherein at least one track link defines a plurality of apertures for receiving a track pin or bushing; a plurality of track fasteners; a plurality of track shoes attached to the track links via the track fasteners; and a first master track link defining a first bore configured to receive a bushing or a pin and including a first interface region including a plurality of teeth; a second master track link defining a first bore configured to receive a bushing or a pin and including a second interface region including a plurality of teeth; wherein the first master track link and the second master track link are configured to establish a direction of assembly, a direction of disassembly, and a direction of tension, and the first interface region and the second interface region are configured such that the plurality of teeth of both the first master track link and second master track link are configured to inhibit movement in the direction of disassembly while allowing movement in the direction of assembly and the direction of tension.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 2 is a side-view of a track chain assembly of the machine of FIG. 1 removed from the machine.

FIG. 3 is a bottom-view illustration of the track chain assembly of FIG. 2.

DETAILED DESCRIPTION

Figure 1:
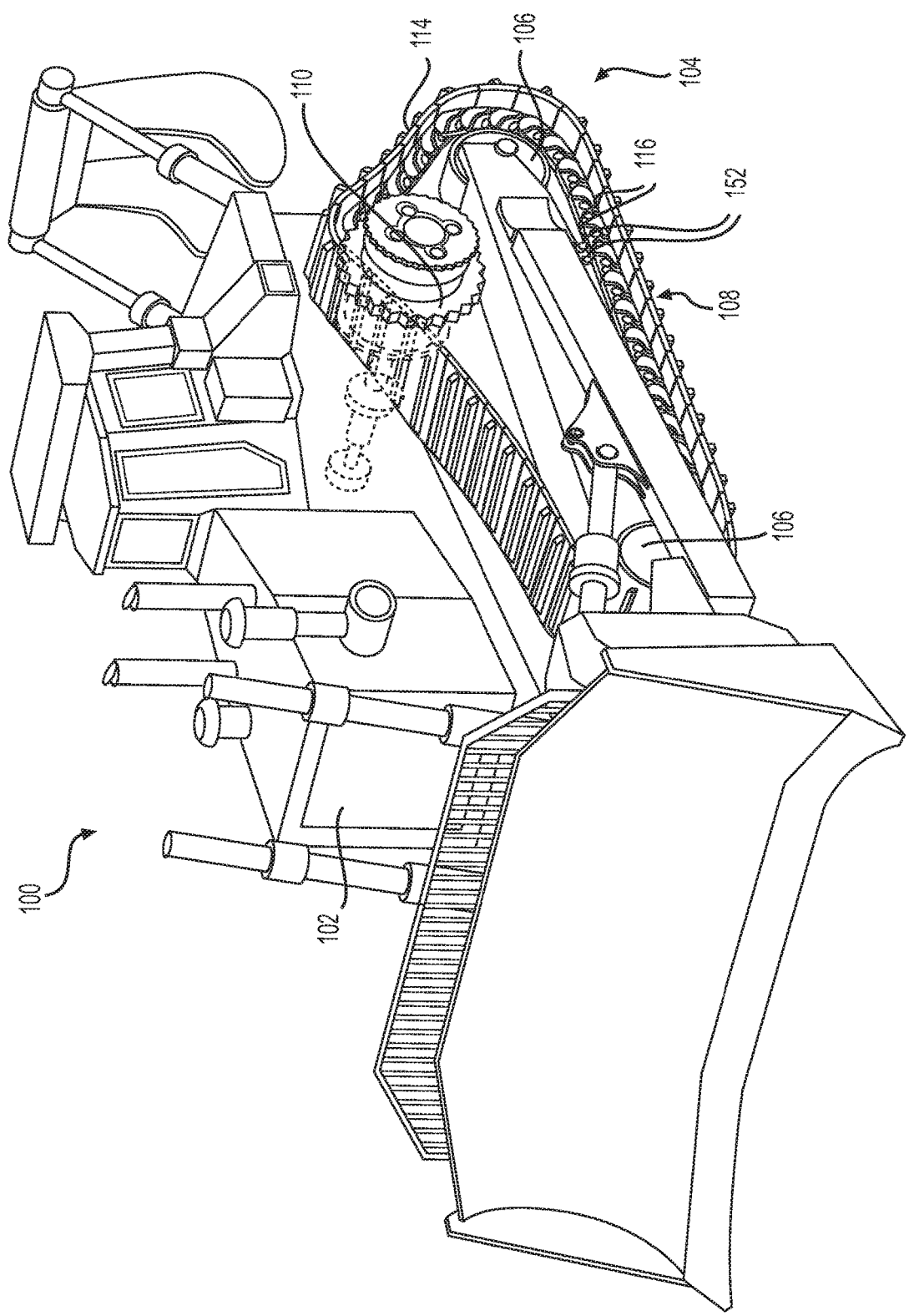
FIG. 1 is a side-view of a machine that may use various track chain assemblies with a master track link according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for creating a track chain assembly using a master track link will now be described. In some embodiments, the master track link is an offset link that may be used with track chain assemblies already in the field. In other embodiments, the master track link may be a straight link, etc.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a chain 112 and a plurality of track shoes 114, each configured to selectively engage a surface, e.g., the ground. Each chain 112 may include a plurality of link subassemblies 116 and a master link subassembly 200, 300 (not clearly shown in FIG. 1). Support rollers 152 are also provided at the bottom of the track to support the chain.

FIGS. 2 and 3 respectively illustrate side-view and bottom-view perspectives of an exemplary chain assembly 112 and, specifically, a plurality of exemplary link subassemblies 116 and a master link subassembly 200, 300. Each one of link subassemblies 116 may include a respective pair of offset link members 118 or a respective pair of inner and outer links when straight links are used (not shown). Each offset link member 118 may include fastener holes 120, e.g., a threaded hole, configured to receive a fastener 150, e. g., a bolt, or cap screw, to attach a track shoe 114 to a given one of link subassemblies 116. Master track link assembly 200 may include a pair of master track links 202 including a first master track link 202 and a second master track link 202'. The master track link subassembly 200 may be used to complete the chains assembly 112 in a manner that will be further described below herein.

Adjacent ones of link subassemblies 116 may be interconnected by way of rod assemblies 122 in the form of pins or bushings. More specifically, each rod assembly 122 may include a substantially cylindrical bushing 124 disposed about a substantially cylindrical pin 126. A pair of bearings (not shown) that are freely rotatable relative to pin 126, and a pair of seals (not shown) may also be provided in the rod assembly or in one of the link members proximate the rod assembly to prevent the loss of lubrication and provide freedom of movement.

In some embodiments, the bearings and seals may be combined functionally in the same assembly. The bushing 124 may be pressed into an aperture 128 of one end 130 of the offset link member 118 and the pin 126 may extend through this end 130 of the offset link member 118 and be received in the aperture 132 of other end 134 of the adjacent offset link member 118'. The pin 126 may be retained in the other end 134 of the adjacent offset link member 118' by being pressed into that link member 118' or be retained therein using a cotter pin or another similar device when a slip fit is being used. Other configurations and methods of assembling the link subassemblies 116 may be provided to create a track chain assembly 112. For example, a pin 126 or bushing 124 may be retained by swaging a boss 154 of a link 118, etc. Of course, a plurality of offset link members 118 are connected in a manner similar to what has just been described to form the track chain assembly 112.

More particularly, the first and second rod assemblies 122 may interface with apertures 128, 132 of adjacent offset link members 118, 118' such that consecutively connected link subassemblies 116 may be pivotally interconnected to one another to form the track chain assembly 112. For example, the outer end 134 of one offset link member 118' may mate in fixed manner with the pin 126 (such as when a press fit is employed) and house the seals and/or bearings assemblies while the inner end 130 of the adjacent offset link member 118 may mate with the bushing 124 in a fixed manner (such as when a press fit if employed). At the same time, the pin 126 may be free to rotate within the bushing 124 such as when some clearance is provided between the pin and the bore of the bushing. Consequently, a pair of adjacent offset link members 118 may be configured to pivot with respect to one another to form an articulating track chain assembly 112. Similarly, master track link subassembly 200 may be interconnected between two standard link subassemblies 116 by way of rod assemblies 122.

A track shoe 114 may be connected to each offset link member 118. Each track shoe 114 may include a base portion 136, a ground-engaging surface 138, a leading edge 140, and a trailing edge 142. Each track shoe 114 may also include opposing side edges 144 (only one of which shown in FIG. 2) disposed between leading edge 140 and trailing edge 142. One or more grousers or ribs 146 may be provided to engage the ground, improving traction. Additionally, each track shoe 114 may also include two pairs of threaded shoe holes 148, each pair disposed along a respective one of the side edges 144 and configured to align with a pair of fastener holes 120 associated with an offset link member 118. In some embodiments, holes 148 may be clearance holes and not be threaded.

Typically, each one of shoe holes 114 may correspond to an associated fastener receiving hole 120 situated on the bottom surface of each of the offset link members 118. As such, each track shoe 114 may respectively connect to a pair of opposing pair of offset link members 118 from one side of the track chain assembly to the other side of the track chain assembly shown in FIG. 3. Threaded fasteners 150, such as, for example, bolts or cap screws, may be respectively disposed in each one of shoe holes 148 and fastener receiving holes 120 to fasten a track shoe 114 to a respective pair of opposing offset link members 118. It is contemplated that the spacing of the fastener receiving holes 120 for each offset link member 118 may be substantially similar such that each track shoe 114 may be configured to be connectable to each of offset link members, assuming that each track shoe is also similarly or identically configured.

Turning now to FIGS. 4 thru 9, master track link subassemblies 200, 300 according to various embodiments of the present disclosure are depicted. Focusing on FIGS. 4 thru 6, a master track link subassembly 200 is shown using keyhole like shaped teeth and corresponding recesses. Other configurations of teeth and recesses are considered to be within the scope of the present disclosure. The first master track link 202 may comprise a first body 204 defining a top surface 206, a bottom surface 208, a first side surface 210 and a second side surface 212 (side surfaces both shown in FIG. 3) defining a thickness therebetween, a proximate end 214 and a distal end 216. The body 204 may also define a first bore 218 the proximate end 214. This bore 218 may extend from or be at least partially defined by either or both side surfaces 210, 212. As shown, the bore 218 is cylindrical and is a thru-bore but may have another suitable configuration.

In addition, the first body 204 includes a first interface region 220 including a plurality of teeth 222 wherein at least one tooth 224 of the plurality of teeth 222 includes a free end 226 and a crown 228 defining a crown width 230 proximate the free end 226 of the at least one tooth 224, the at least one tooth 224 also includes a root 232 disposed opposite the crown 228 defining a root width 234. For many of the embodiments discussed herein, the crown width 230 is greater than the root width 234.

Figure 4:
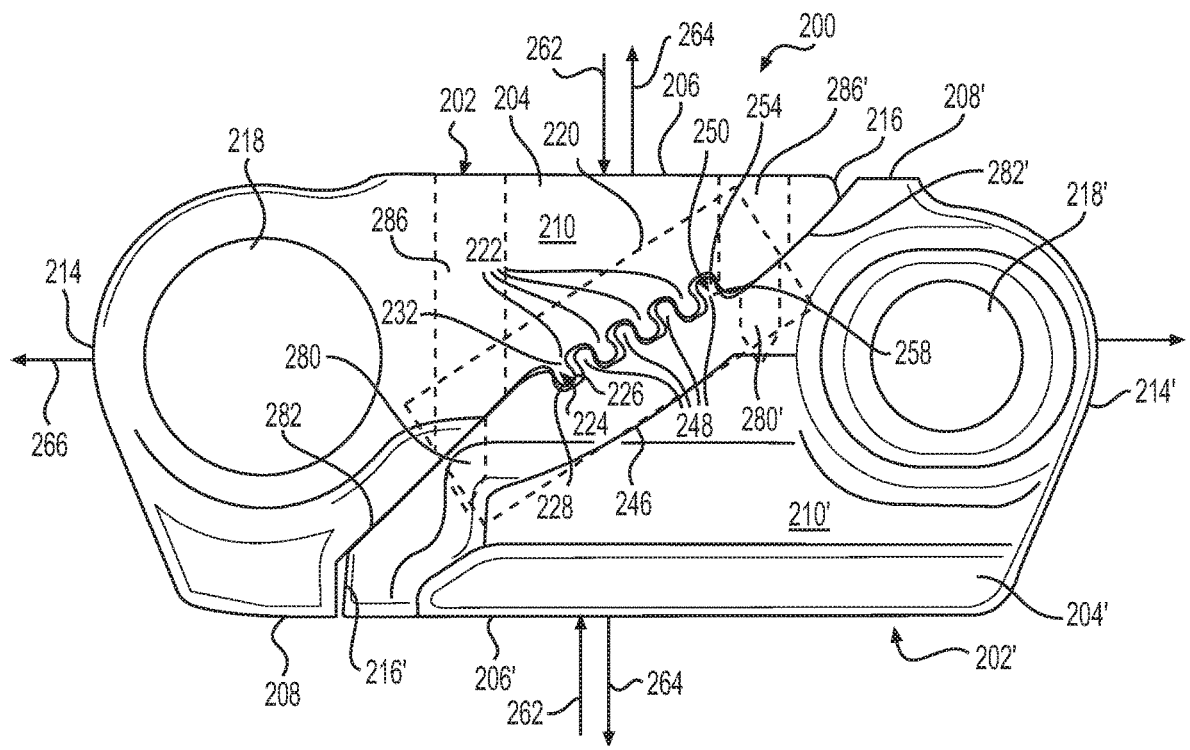
FIG. 4 is a side view of a pair of master track links according to an embodiment of the present disclosure mating with each other removed from the track chain assembly of FIG. 2, shown in a fully mated and assembled configuration. The teeth of the master track links resemble keyhole-like geometry.
Figure 5:
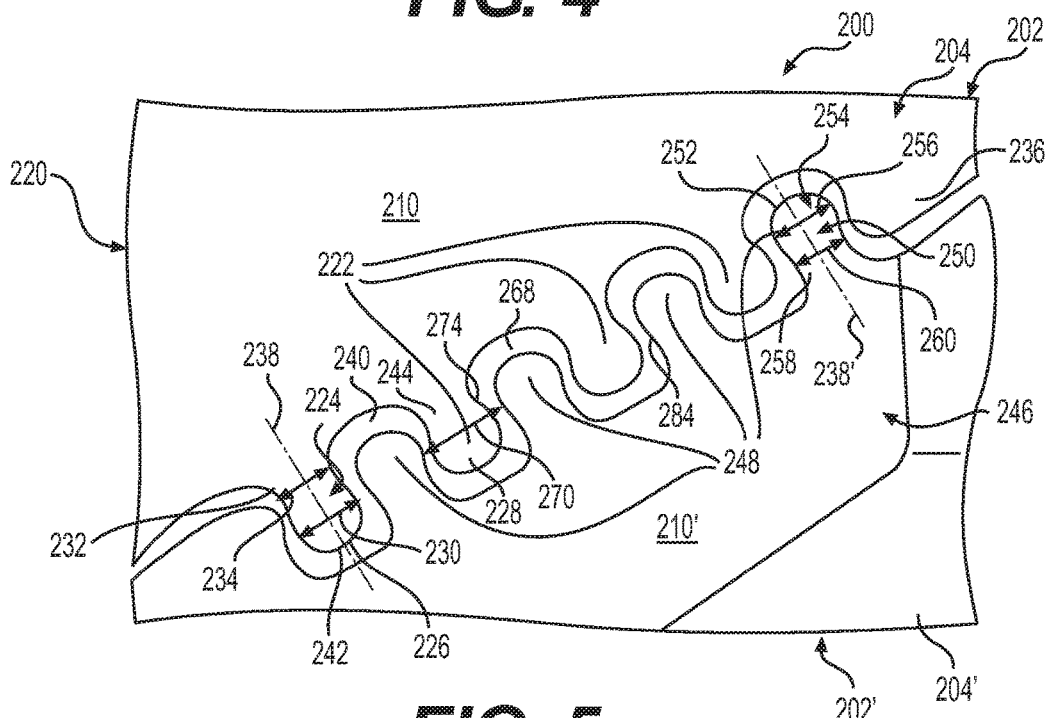
FIG. 5 is an enlarged detail view of the mating teeth of the master track links of FIG. 4, shown in a partially mated and assembled condition, such as when the track shoes have not been attached fully yet to the master track links to complete the mating and assembly process.
Figure 6:
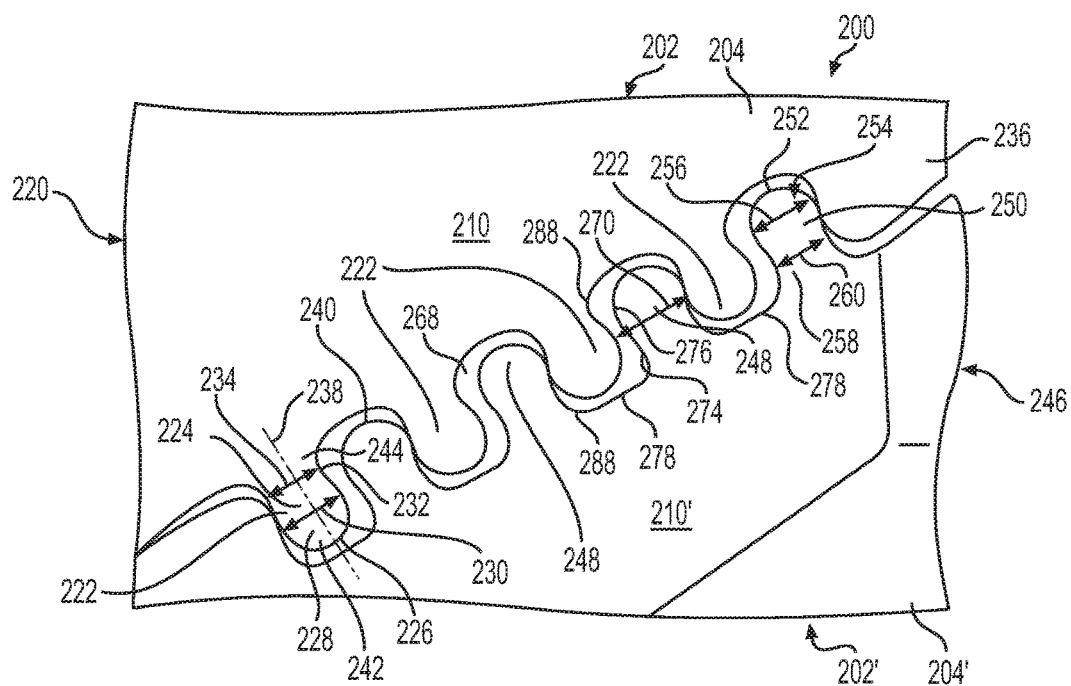
FIG. 6 is an enlarged detail view of the mating teeth of the master track links of FIG. 4, shown in a fully mated and assembled condition, such as when track shoes have been fully fastened onto the master track links.

For the embodiments shown in FIGS. 4 thru 6, each of the plurality of teeth 222 includes a free end 226 and a crown 228 defining a crown width 230 proximate the free end 226, and each of the plurality of teeth 222 includes a root 232 disposed opposite the crown 228 defining a root width 234, and the crown width 230 of each of the plurality of teeth 222 is greater than the root width 234 of the same tooth. The ratio of the crown width 230 to the root width 234 for each of the plurality of teeth 222 may range from 1.05 to 1.50.

Furthermore, each of the plurality of teeth 222 are identically or similarly configured and the first interface region 220 of the first body 204 further includes a rear tooth 236 that is differently configured than the plurality of teeth 222. More specifically, the rear tooth 236 has generally a ramp configuration and the plurality of similarly of identical teeth 222 includes four or more teeth. The number of teeth, similarity or differences in configuration of the teeth, dimensions of the teeth, etc. may be varied as needed or desired in other embodiments. It is to be understood that the crown width 230 is the maximum dimension of the crown perpendicular to the axis of extension 238 of the tooth 224 while the root width 234 is the minimum dimension of the root 232 perpendicular to the axis of extension 238 of the tooth 224.

In addition, the first interface region 220 defines a series of recesses 240 between each of the plurality of teeth 222 that are at least partially complimentarily shaped to the plurality of teeth 222. As alluded to earlier herein, each of the plurality of teeth 222 includes a rounded crown 242 and a necked down root 244, forming a keyhole-like configuration. This may not be the case in other embodiments such as will be discussed later herein with reference to FIGS. 7 thru 9.

With continued reference to FIGS. 4 thru 6, the master track link subassembly 200 further comprises a second master track link 202' including a second body 204' defining a top surface 206', a bottom surface 208', a first side surface 210' and a second side surface 212' defining a thickness therebetween, a proximate end and a distal end. The second body 204' also defines a first bore 218' adjacent the proximate end 214'. The second body 204' includes a second interface region 246 including a plurality of teeth 248, wherein at least one tooth 250 of the plurality of teeth 248 includes a free end 252 and a crown 254 defining a crown width 256 disposed proximate the free end 252 of the at least one tooth 250, the at least one tooth 250 also includes a root 258 disposed opposite the crown 254 defining a root width 260. The crown width 256 may be greater than the root width 260. Put into other words, the second interface region 246 may be similarly or identically configured to the first interface region 220, being a mirror image for mating therewith.

Furthermore, the first master track link 202 may be mated with the second master track link 202', defining a direction of assembly 262 and a direction of disassembly 264 that are opposite each other. These directions are essentially parallel to the vertical direction as shown in FIGS. 4 thru 6. In like fashion, the first and second master track links 202, 202' may define a direction of tension 266 that is perpendicular to the direction of assembly 262 and the direction of disassembly 264. This direction of tension 266 is so called as this represents the load vector when the chain 112 is in use. Also, the first master track link 202 and the second master track link 202' are configured to inhibit the first master track link 202 and the second master track link 202' from moving away from each other in the direction of disassembly 264 while still being free to move toward each other in the direction of assembly 262, and in the direction of tension 266. This facilitates the assembly of the master track link subassembly 200 when completing a track chain assembly 112, helping to prevent the separation of the master track links 202, 202' unintentionally.

More specifically, focusing on FIG. 5, the first and second master track links 202, 202' may be assembled in a direction perpendicular to the view so that the teeth 222, 248 are trapped in the recesses 240, 240', helping to prevent the disassembly of master track links 202, 202' from each other. In some embodiments, the recess is large enough to allow the assembly to be accomplished vertically. Due to the clearance or gap 268 found between the teeth 222, 248 and the corresponding recess in which each tooth is inserted, there is freedom for the first and second master track links 202, 202' to move toward each other in a direction of assembly 262, and along the direction of tension 266 (or opposite thereto) as the track shoe 114 (see FIG. 2) is mounted onto the master track links 202, 202' via fasteners 150. The minimum dimension 270 of the recess 240 may be less than the crown width 230, 256 so that disassembly is less likely. An undercut is formed along the direction of disassembly 264, helping to keep the master track links 202, 202' together.

For the embodiment shown in solid lines, the recess 240 has curved or arcuate side edges 274 that mimic the arcuate side edges 276 of the teeth 222, 248 but are spaced further away from each other by a flat surface 278 at the bottom of the recess 240, providing extra clearance or gap 268. The bottom radii 288 may have values of greater than 2 mm and may be in the range of 8 mm to 10 mm in some embodiments.

Considering FIGS. 5 and 6 together, as the shoes 114 are fastened to the master track links 202, 202' via fasteners 150 (see FIG. 2) that mate with threaded holes 280, the arcuate side edges 274, 276 of the mating teeth slide past each other, allowing the first and second master track links 202, 202' to approach each other along the direction of assembly 262 while also moving along the direction of tension 266. Once the ramped portions 282 of the first and second interface regions 220, 246 contact each other, the configuration of FIG. 6 has been achieved. A gap 268 is shown to be provided near the free end 226 of each tooth 222, 248 and along the rear surfaces 284 of each tooth. Again, the size of the gap 268 may be adjusted depending on the application to achieve the desired compromise between ease of initial assembly of the master track links 202, 202' before fastening and the desired final resting position of the master track links 202, 202' after fastening. Tangential contact is shown between the crown portions 228, 254 or root portions 232, 258 of mating teeth 222, 248.

Figure 7:
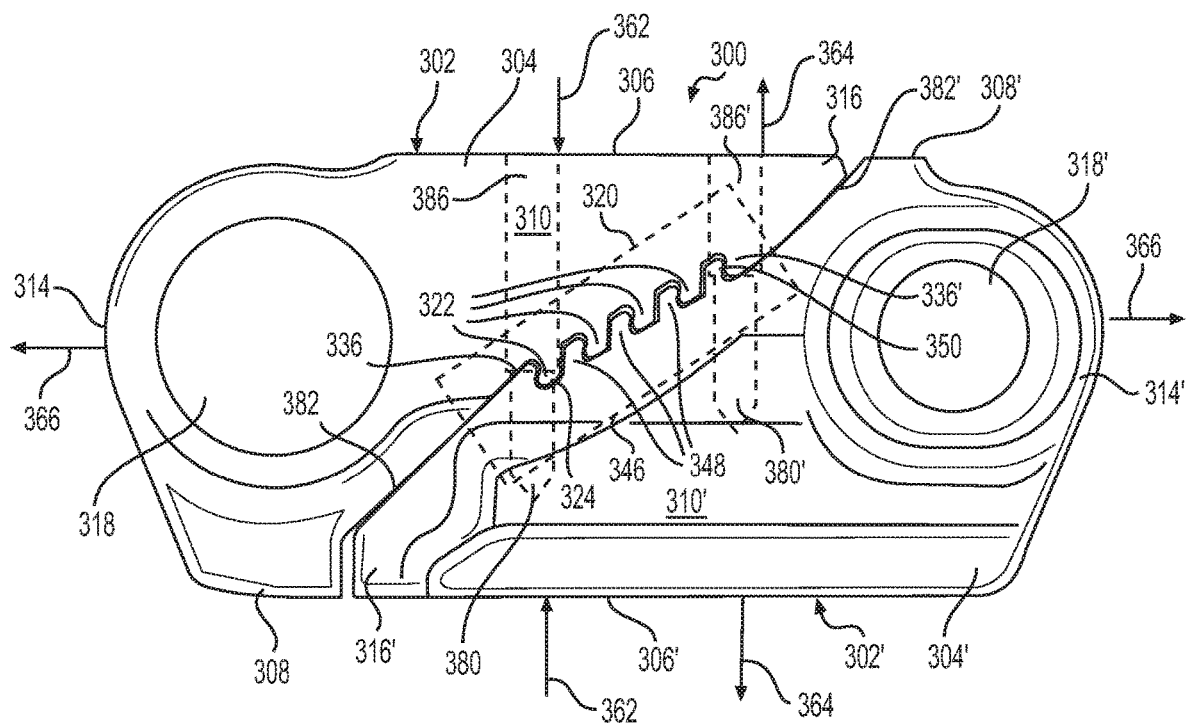
FIG. 7 is a side view of a pair of master track links according to another embodiment of the present disclosure mating with each other removed from the track chain assembly of FIG. 2, shown in a fully mated and assembled configuration. The teeth of the master track links resemble zipper-like geometry.
Figure 8:
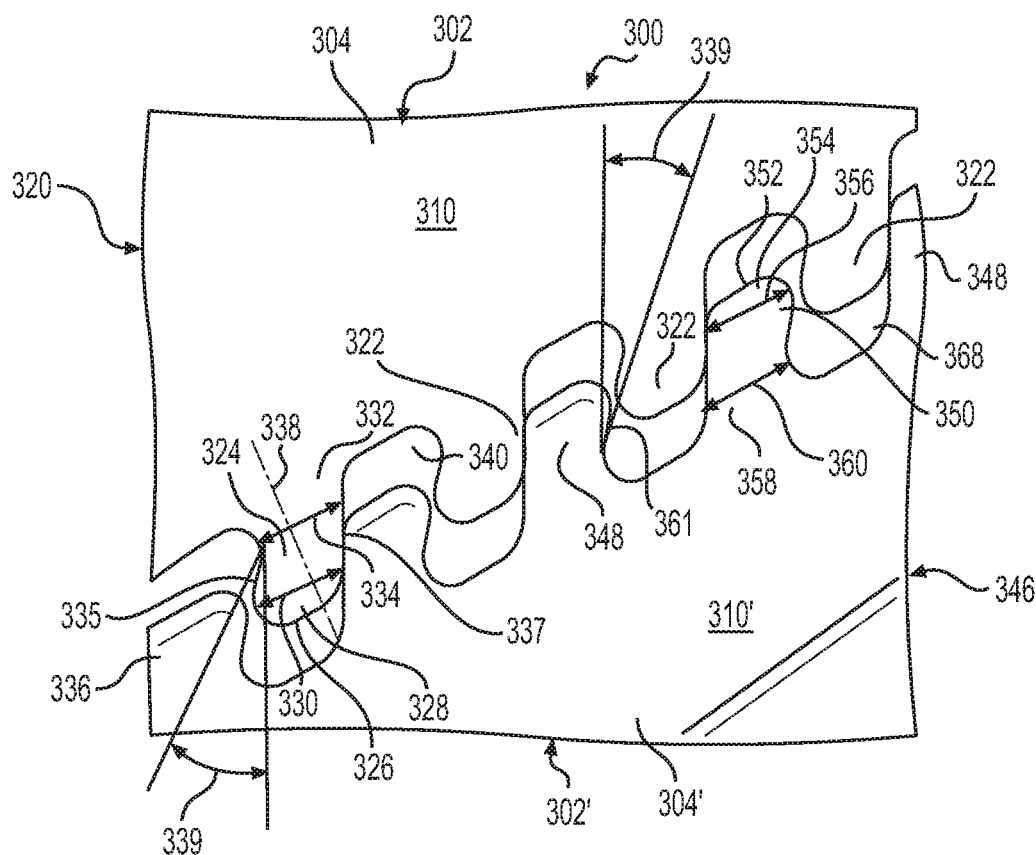
FIG. 8 is an enlarged detail view of the mating teeth of the master track links of FIG. 7, shown in a partially mated and assembled condition, such as when the track shoes have not been attached fully yet to the master track links to complete the mating and assembly process.
Figure 9:
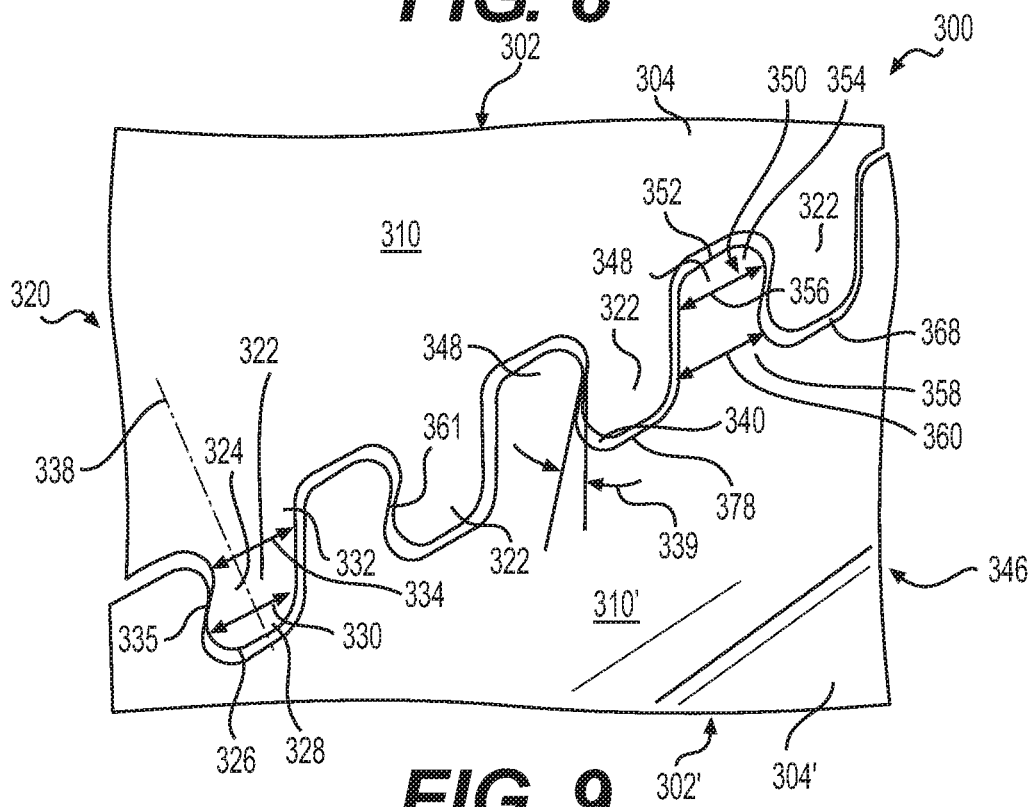
FIG. 9 is an enlarged detail view of the mating teeth of the master track links of FIG. 7, shown in a fully mated and assembled condition, such as when track shoes have been fully fastened onto the master track links.

Looking now at FIGS. 7 thru 9, a master track link subassembly 300 including various features as described regarding the embodiments of FIGS. 4 thru 6 is illustrated. As shown, this master track link subassembly 300 employs zipper like shaped teeth and corresponding recesses. Other configurations of teeth and recesses are considered to be within the scope of the present disclosure. For this embodiment, the first master track link 302 may comprise a first body 304 defining a top surface 306, a bottom surface 308, a first side surface 310 and a second side surface 312 (side surfaces both shown in FIG. 3) defining a thickness therebetween, a proximate end 314 and a distal end 316. The body 304 may also define a first bore 318 the proximate end 314. This bore 318 may extend from or be at least partially defined by either or both side surfaces 310, 312. As shown, the bore 318 is cylindrical and is a thru-bore but may have another suitable configuration.

The first body 304 also defines a direction of assembly 362, a direction of disassembly 364 and a direction of tension 366 and includes a first interface region 320 including a plurality of teeth 322 wherein at least one tooth 324 of the plurality of teeth 322 includes a free end 326 and a crown 328 defining a crown width 330 proximate the free end 326 of the at least one tooth 324, the at least one tooth 324 also includes a root 332 disposed opposite the crown 328 defining a root width 334. The crown width 330 may be greater than the root width 334 and the at least one tooth 324 includes an angled front surface 335 connecting the crown 328 to the root 332, forming an undercut in the direction of disassembly 364, and a rear surface 336 connecting the crown 328 to the root 332, not forming an undercut in the direction of disassembly 364. As shown, the rear surface 337 may be substantially vertical or parallel with the direction of assembly 362 or the direction of disassembly 364 (e.g. 0-5 degrees). As mentioned previously, the crown width 330 is the maximum dimension measured along a direction perpendicular to the axis of extension 338 of the tooth 324 while the root width 334 is the minimum dimension measured along a direction perpendicular to the axis of extension 338 of the tooth 324. A rear tooth 336 with a ramp like configuration is also provided.

Again, for the embodiment shown in FIGS. 7 thru 9, each of the plurality of teeth 322 includes a free end 326 and includes a crown 328 defining a crown width 330 proximate the free end 326, and each of the plurality of teeth 322 includes a root 332 disposed opposite the crown 328 defining a root width 334, and the crown width 330 of each of the plurality of teeth 322 may be greater than the root width 334 of the same tooth. Also, each of the plurality of teeth 322 includes an angled front surface 335 (so called as it form an angle 339 with the direction of disassembly ranging from 5 degrees to 35 degrees in some embodiments), connecting the crown 328 to the root 332, forming an undercut in the direction of disassembly 364, and a rear surface 337 connects the crown 328 to the root 332, not forming an undercut in the direction of disassembly 364. The ratio of the crown width 330 to the root width 334 for each of the plurality of teeth 322 may range from 1.05 to 1.50 in certain embodiments. The configuration, number, and dimensions of the various teeth and recesses may be varied as needed or desired in other embodiments.

As shown in FIGS. 7 thru 9, each of the plurality of teeth 322 are identically or similarly configured and the first interface region 320 of the first body 304 further includes a rear tooth 336 that is differently configured than the plurality of teeth 322. The rear tooth 336 may have ramp configuration as shown. The plurality of teeth 322 may include four or more teeth. The first interface region 320 defines a series of recesses 340 between each of the plurality of teeth 322 that are at least partially complimentarily shaped to the plurality of teeth 322 for receiving the teeth. Each of the plurality of teeth 322 includes an asymmetrical configuration, forming a zipper-like configuration.

This master track link subassembly 300 may further comprise a second master track link 302' including a second body 304' defining a top surface 306', a bottom surface 308', a first side surface 310' and a second side surface 312' defining a thickness therebetween, a proximate end 314' and a distal end 316', a direction of assembly 362, a direction of disassembly 364, and a direction of tension 366. Also, the second body 304' defines a first bore 318' disposed adjacent the proximate end 314' and includes a second interface region 346 including a plurality of teeth 348, wherein at least one tooth 350 of the plurality of teeth 348 includes a free end 352 and a crown 354 defining a crown width 356 proximate the free end 352 of the at least one tooth 350, the at least one tooth 350 also includes a root 358 disposed opposite the crown 354 defining a root width 360.

Also, the crown width 356 may be greater than the root width 360 and the at least one tooth 350 includes an angled front surface 361 connecting the crown 354 to the root 358, forming an undercut in the direction of disassembly 364, and a rear surface 363 connects the crown 354 to the root 358, not forming an undercut in the direction of disassembly 364.

When the first master track link 302 is mated with the second master track link 302', and the first master track link 302 and the second master track link 302' are configured to inhibit the first master track link 302 and the second master track link 302' from moving away from each other in the direction of disassembly 364 while still being free to move toward each other in the direction of assembly 362, and in the direction of tension 366.

Referring to FIGS. 8 and 9, the first and second master track links 302, 302' may be assembled in a direction perpendicular to the view so that the teeth 322, 348 are trapped in the recesses 340, helping to prevent the disassembly of master track links 302, 302' from each other. In other embodiments, the recess may be large enough to allow assembly in the vertical direction. Due to the clearance or gap 368 found between the teeth 322, 348 and the corresponding recess 340 in which each tooth is inserted, there is freedom for the first and second master track links 302, 302' to move toward each other in a direction of assembly 362, and along the direction of tension 366 (or opposite thereto) as the track shoe 114 (see FIG. 2) is mounted onto the master track links 302, 302' via fasteners 150 mating with threaded holes 380. The minimum dimension 370 of the recess 340 may be less than the crown width 330, 356 so that disassembly is less likely. An undercut is formed along the direction of disassembly 364, helping to keep the master track links 302, 302' together. It is also to be understood that any of dimensions discussed for FIGS. 6 thru 9 are measured in like manner as similar dimensions discussed with reference to FIGS. 4 thru 6.

For the embodiment shown in solid lines, the recess 340 has a substantial flat bottom surface 378. Ramped portions 382 are provided for the first and second interface regions 320, 346.

For many of the embodiments discussed herein, the first interface region 320 of the first master track link 302 and the second interface region 346 of the second master track link 302' are similarly or identically configured. In particular, the teeth of one master track link 302 may be a mirror image of the teeth of the other master track link 302'.

For any of the embodiments discussed herein, when the desired length of the chain assembly has been achieved, the distal end 216, 316 of a pair of opposing master track link members 202, 302 are attached to pair of opposing free ends of the chain 112. Then, once the chain assembly 112 has been routed about the drive sprockets 110, idler wheels 106, rollers, etc. of the undercarriage 104, the chain 112 is completed by forming a master track link subassembly 200, 300 using a fastener 150 as previously described.

Also, any of the threaded holes 280, 380 may be at least partially defined by hardened material that forms the rail portions of the links 202, 302, providing suitable support for the weight of the machine and its payload. Clearance holes 286, 386 may also be provided that are aligned with the threaded holes to allow fasteners 150 to pass to access and mate with the threaded holes.

INDUSTRIAL APPLICABILITY

In practice, a master track link, a pair of master track links, a chain using a master track link or a pair of track links, or a pair of master track link subassemblies according to any embodiment described herein may be sold, bought, manufactured or otherwise obtained in an OEM or aftermarket context.

A master track link 202, 302 or master track link subassembly 200, 300 may be attached to the free end of a chain assembly 112 at the factory and sold as a replacement part or already installed on a machine such as shown and described previously with respect to FIG. 1. Completing the chain assembly 112 simply requires the user to align the master track links 202, 302 and fastening them together.

The chain assembly 112 as a whole may be described as follows in reference to FIGS. 1 thru 9. The track chain assembly 112 may comprise a plurality of track pins 126 and track bushings 124 disposed about the track pins 126, and a plurality of track links 118 that are connected to each other by either a track pin 126 or a track bushing 124, wherein at least one track link 118 defines a plurality of apertures 128, 132 for receiving a track pin 126 or bushing 124. The chain assembly 112 would typically also include a plurality of track fasteners 150 and a plurality of track shoes 114 attached to the track links 118 via the track fasteners 150. Finally, at least one and typically two master track links 202, 302 are attached at each free end of the track chain assembly 112.

The first master track link 202, 302 may define a first bore 218, 318 configured to receive a bushing 124 or a pin 126 and may include a first interface region 220, 320 including a plurality of teeth 222, 322. Similarly, the second master track 202', 302' link defines a first bore 218', 318' configured to receive a bushing 124 or a pin 126 and may include a second interface region 246, 346 including a plurality of teeth 248, 348.

The first master track link 202, 302 and the second master track link 202', 302' are configured to establish a direction of assembly 262, 362, a direction of disassembly 264, 364, and a direction of tension 266, 366, and the first interface region 220, 320 and the second interface region 246, 346 are configured such that the plurality of teeth 222, 322, 248, 348 of both the first master track link 202, 302 and second master track link 202', 302' are configured to inhibit movement in the direction of disassembly 264, 364 while allowing movement in the direction of assembly 262, 362 and the direction of tension 266, 366.

In some embodiments, such as shown in FIGS. 4 thru 9, the first master track link 202, 302 and the second master track link 202', 302' include a first interface region 220, 320 and a second interface region 246, 346 that are similarly or identically configured.

Looking at FIGS. 4 thru 6, the first interface region 220 may include a plurality of teeth 222 having keyhole configured geometry and may define a plurality of at least partially complimentarily shaped recesses 240 interposed between the plurality of teeth 222, and the second interface region 246 may include a plurality of teeth 248 having a keyhole configured geometry and may define a plurality of at least partially complimentarily shaped recesses 240' interposed between the plurality of teeth 248 of the second interface region 246. The first and second interface regions 220, 246 are mirror images of each other, facilitating the mating of the first master track link 202 with the second master track link 202'.

Refer to FIGS. 7 thru 9, the first interface region 320 may include a plurality of teeth 322 having zipper configured geometry and may define a plurality of at least partially complimentarily shaped recesses 340 interposed between the plurality of teeth 322, and the second interface region 346 may include a plurality of teeth 348 having a zipper configured geometry and may define a plurality of at least partially complimentarily shaped recesses 340' interposed between the plurality of teeth 348 of the second interface region 346.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

PARTS LIST 100 machine
102 power source
104 undercarriage
106 idler wheel
108 track
110 drive sprocket
112 chain assembly
114 track shoe
116 link subassembly
118 offset link member
120 fastener receiving hole
122 rod assembly
124 bushing
126 pin
128 aperture
130 one end
132 aperture
134 other end
136 base portion
138 surface
140 leading edge
142 trailing edge
144 side edge
146 rib/grouser
148 shoe hole
150 fastener
152 support rollers
154 boss
200 master track link subassembly
202 first master track link
202' second master track link
204 first body
204' second body
206 top surface of 204
206' top surface of 204'
208 bottom surface of 204
208' bottom surface of 204'
210 first side surface of 204
210' first side surface of 204'
212 second side surface of 204
212' second side surface of 204'
214 proximate end of 204
214' proximate end of 204'
216 distal end of 204
216' distal end of 204'
218 first bore of 204
218' first bore of 204'
220 first interface region
222 plurality of teeth
224 at least one tooth of 222
226 free end
228 crown
230 crown width
232 root
234 root width
236 rear tooth
238 axis of extension
240 recesses
242 rounded crown
244 necked down root
246 second interface region
248 plurality of teeth
250 at least one tooth
252 free end
254 crown
256 crown width
258 root
260 root width
262 direction of assembly
264 direction of disassembly
266 direction of tension
268 gap
270 minimum dimension
272 dotted lines
274 arcuate side edges of 240
276 arcuate side edges of 222, 248
278 flat surface of 240
280 threaded holes
282 ramped portion
284 rear surface
286 clearance holes
288 bottom radii
300 master track link subassembly 302 first master track link
302' second master track link
304 first body
304' second body
306 top surface
306' top surface
308 bottom surface
308' bottom surface
310 first side surface
310' first side surface
312 second side surface
312' second side surface
314 proximate end
314' proximate end
316 distal end
316' distal end
318 first bore
318' first bore
320 first interface region
322 plurality of teeth
324 at least one tooth
326 free end
328 crown
330 crown width
332 root
334 root width
335 angled front surface
337 rear surface
336 rear tooth
338 axis of extension
339 angle
340 recess
346 second interface region
348 plurality of teeth
350 at least one tooth
352 free end
354 crown
356 crown width
358 root
360 root width
361 angled front surface
362 direction of assembly
363 rear surface
364 direction of disassembly
366 direction of tension
368 gap
370 minimum dimension
372 dotted lines
378 bottom flat surface
380 threaded holes
382 ramped portions
386 clearance holes

What is claimed is:

1. A pair of master track links comprising:
a first master track link including
a first body defining a top surface, a bottom surface, a first side surface and a second side surface defining a thickness therebetween, a proximate end and a distal end; wherein
the first body defines a first bore adjacent the proximate end;
the first body includes a first interface region including a plurality of teeth wherein at least one tooth of the plurality of teeth includes a free end and a crown defining a crown width proximate the free end of the at least one tooth, the at least one tooth also includes a root disposed opposite the crown defining a root width; and
the crown width is greater than the root width.

2. The pair of master track links of claim 1 wherein each of the plurality of teeth includes a free end and a crown defining a crown width proximate the free end, and each of the plurality of teeth includes a root disposed opposite the crown defining a root width, and the crown width of each of the plurality of teeth is greater than the root width of the same tooth.

3. The pair of master track links of claim 2 wherein each of the plurality of teeth are identically configured and the first interface region of the first body further includes a rear tooth that is differently configured than the plurality of teeth.

4. The pair of master track links of claim 3 wherein the plurality of teeth includes four teeth.

5. The pair of master track links of claim 3 wherein the first interface region defines a series of recesses between each of the plurality of teeth that are at least partially complimentarily shaped to the plurality of teeth.

6. The pair of master track links of claim 3 wherein each of the plurality of teeth includes a rounded crown and a necked down root, forming a keyhole-like configuration.

7. The pair of master track links of claim 6 wherein the ratio of the crown width to the root width for each of the plurality of teeth ranges from 1.05 to 1.50.

8. The pair of master track links of claim 6 further comprising:
a second master track link including
a second body defining a top surface, a bottom surface, a first side surface and a second side surface defining a thickness therebetween, a proximate end and a distal end; wherein
the second body defines a first bore adjacent the proximate end;
the second body includes a second interface region including a plurality of teeth, wherein at least one tooth of the plurality of teeth includes a free end and a crown defining a crown width proximate the free end of the at least one tooth, the at least one tooth also includes a root disposed opposite the crown defining a root width; and
the crown width is greater than the root width;
wherein the first master track link is mated with the second master track link, defining a direction of assembly and disassembly that are opposite each other and a direction of tension that is perpendicular to the direction of assembly and disassembly, and the first master track link and the second master track link are configured to inhibit the first master track link and the second master track link from moving away from each other in the direction of disassembly while still being free to move toward each other in the direction of assembly, and in the direction of tension.

9. A pair of master track links comprising:
a first master track link including
a first body defining a top surface, a bottom surface, a first side surface and a second side surface defining a thickness therebetween, a proximate end and a distal end, a direction of assembly, a direction of disassembly and a direction of tension; wherein
the first body defines a first bore adjacent the proximate end;
the first body includes a first interface region including a plurality of teeth wherein at least one tooth of the plurality of teeth includes a free end and a crown defining a crown width proximate the free end of the at least one tooth, the at least one tooth also includes a root disposed opposite the crown defining a root width; and the crown width is greater than the root width and the at least one tooth includes an angled front surface connecting the crown to the root, forming an undercut in the direction of disassembly, and a rear surface connecting the crown to the root, not forming an undercut in the direction of disassembly.

10. The pair of master track links of claim 9 wherein each of the plurality of teeth includes the free end and includes the crown defining the crown width proximate the free end, and each of the plurality of teeth includes the root disposed opposite the crown defining the root width, and the crown width of each of the plurality of teeth is greater than the root width of the same tooth, and each of the plurality of teeth includes the angled front surface connecting the crown to the root, forming the undercut in the direction of disassembly, and the rear surface connecting the crown to the root, not forming the undercut in the direction of disassembly.

11. The pair of master track links of claim 10 wherein each of the plurality of teeth are identically configured and the first interface region of the first body further includes a rear tooth that is differently configured than the plurality of teeth.

12. The pair of master track links of claim 11 wherein the plurality of teeth includes four teeth.

13. The pair of master track links of claim 11 wherein the first interface region defines a series of recesses between each of the plurality of teeth that are at least partially complimentarily shaped to the plurality of teeth.

14. The pair of master track links of claim 11 wherein each of the plurality of teeth includes an asymmetrical configuration, forming a zipper-like configuration.

15. The pair of master track links of claim 14 wherein the ratio of the crown width to the root width for each of the plurality of teeth ranges from 1.05 to 1.50.

16. The pair of master track links of claim 14 further comprising:
a second master track link including
a second body defining a top surface, a bottom surface, a first side surface and a second side surface defining a thickness therebetween, a proximate end and a distal end, a direction of assembly, a direction of disassembly, and a direction of tension; wherein
the second body defines a first bore adjacent the proximate end;
the second body includes a second interface region including a plurality of teeth, wherein at least one tooth of the plurality of teeth includes a free end and a crown defining a crown width proximate the free end of the at least one tooth, the at least one tooth also includes a root disposed opposite the crown defining a root width; and
the crown width is greater than the root width and the at least one tooth includes an angled front surface connecting the crown to the root, forming an undercut in the direction of disassembly, and a rear surface connecting the crown to the root, not forming an undercut in the direction of disassembly;

wherein the first master track link is mated with the second master track link, and the first master track link and the second master track link are configured to inhibit the first master track link and the second master track link from moving away from each other in the direction of disassembly while still being free to move toward each other in the direction of assembly, and in the direction of tension.

17. A track chain assembly comprising:
a plurality of track pins and track bushings disposed about the track pins; and
a plurality of track links that are connected to each other by either a track pin or a track bushing, wherein at least one track link defines a plurality of apertures for receiving a track pin or bushing;
a plurality of track fasteners;
a plurality of track shoes attached to the track links; and
a first master track link defining a first bore configured to receive a bushing or a pin and including a first interface region including a plurality of teeth;
a second master track link defining a first bore configured to receive a bushing or a pin and including a second interface region including a plurality of teeth; wherein
the first master track link and the second master track link are configured to establish a linear direction of assembly, a linear direction of disassembly, and a direction of tension that is perpendicular to the linear direction of disassembly, and the plurality of teeth of the first master track link and the plurality of teeth of the second master track link form an undercut in the linear direction of disassembly.

18. The track chain assembly of claim 17 wherein the first master track link and the second master track link include a first interface region and a second interface region that are identically configured.

19. The track chain assembly of claim 18 wherein the first interface region includes a plurality of teeth having keyhole configured geometry and defines a plurality of at least partially complimentarily shaped recesses interposed between the plurality of teeth, and the second interface region includes a plurality of teeth including a plurality of contiguously interconnected arcuate surfaces, and defines a plurality of at least partially complimentarily shaped recesses interposed between the plurality of teeth of the second interface region.

20. The track chain assembly of claim 18 wherein the first interface region includes a plurality of teeth including a plurality of planar surfaces that are oblique to each other, and defines a plurality of at least partially complimentarily shaped recesses interposed between the plurality of teeth, and the second interface region includes a plurality of teeth having a zipper configured geometry and defines a plurality of at least partially complimentarily shaped recesses interposed between the plurality of teeth of the second interface region.

* * * * *